(12) United States Patent
Merten et al.

(10) Patent No.: US 9,354,875 B2
(45) Date of Patent: May 31, 2016

(54) ENHANCED LOOP STREAMING DETECTOR TO DRIVE LOGIC OPTIMIZATION

(71) Applicants: Matthew C. Merten, Hillsboro, OR (US); Justin M. Deinlein, Portand, OR (US); Yury N. Ilin, Beaverton, OR (US); Alexandre J. Farcy, Hillsboro, OR (US); Tong Li, Portland, OR (US); Srikanth T. Srinivasan, Portland, OR (US)

(72) Inventors: Matthew C. Merten, Hillsboro, OR (US); Justin M. Deinlein, Portand, OR (US); Yury N. Ilin, Beaverton, OR (US); Alexandre J. Farcy, Hillsboro, OR (US); Tong Li, Portland, OR (US); Srikanth T. Srinivasan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 689 days.

(21) Appl. No.: 13/728,273

(22) Filed: Dec. 27, 2012

(65) Prior Publication Data
US 2014/0189306 A1   Jul. 3, 2014

(51) Int. Cl.
G06F 9/30       (2006.01)
(52) U.S. Cl.
CPC .................. G06F 9/30065 (2013.01)

(58) Field of Classification Search
CPC ................................... G06F 9/30065
See application file for complete search history.

(56) References Cited

U.S. PATENT DOCUMENTS

| | | | |
|---|---|---|---|
| 5,258,943 A * | 11/1993 | Gamez et al. ................. 708/497 |
| 6,847,365 B1 * | 1/2005 | Miller et al. .................. 345/502 |
| 6,880,068 B1 * | 4/2005 | McGrath ....................... 712/220 |
| 7,739,442 B2 | 6/2010 | Gonion |
| 2003/0037221 A1 * | 2/2003 | Gschwind et al. ................ 712/3 |
| 2003/0126407 A1 * | 7/2003 | Venkatraman et al. ....... 712/214 |
| 2004/0128573 A1 * | 7/2004 | Sperber et al. ................ 713/320 |
| 2006/0036834 A1 * | 2/2006 | Maiyuran et al. ............. 712/214 |
| 2010/0235416 A1 * | 9/2010 | Oliver .......................... 708/209 |
| 2011/0161748 A1 * | 6/2011 | Casper et al. ................. 714/708 |

* cited by examiner

*Primary Examiner* — William B Partridge
*Assistant Examiner* — William Nguyen
(74) *Attorney, Agent, or Firm* — Nicholson De Vos Webster & Elliott LLP

(57) ABSTRACT

An enhanced loop streaming detection mechanism is provided in a processor to reduce power consumption. The processor includes a decoder to decode instructions in a loop into micro-operations, and a loop streaming detector to detect the presence of the loop in the micro-operations. The processor also includes a loop characteristic tracker unit to identify hardware components downstream from the decoder that are not to be used by the micro-operations in the loop, and to disable the identified hardware components. The processor also includes execution circuitry to execute the micro-operations in the loop with the identified hardware components disabled.

15 Claims, 10 Drawing Sheets

REGISTER ARCHITECTURE 200

FIG. 10

ENHANCED LOOP STREAMING DETECTOR TO DRIVE LOGIC OPTIMIZATION

TECHNICAL FIELD

The present disclosure pertains to the field of processing logic, microprocessors, and associated instruction set architecture that, when executed by the processor or other processing logic, perform logical, mathematical, or other functional operations.

BACKGROUND ART

A typical application spends a significant amount of time in loops, and many of the loops have relatively small loop bodies. Modern processors generally include logic to detect loops; e.g., a Loop Streaming Detector (LSD) is hardware logic in the front end of a processor for detecting the presence of these frequent small loops in a stream of micro-instructions.

During normal execution, micro-operations are streamed from fetch and decode units (which may include instruction decoders (XLAT), the micro-sequencer ROM (MSROM), or the decoded streaming buffer (DSB)) through an Instruction Decode Queue (IDQ) into the back end of the processor, where the micro-operations are executed. The LSD checks whether the decoded micro-operations in the IDQ contain a loop. If a loop is detected, the micro-operations in the loop body can be streamed directly out of the IDQ. That is, rather than repeatedly streaming the iterations of the loop body from the fetch and decode units, the iterations can be dispatched directly from the IDQ, allowing the fetch and decode units to be powered down. Thus, the IDQ is treated as a loop cache to reduce power consumption in the front end. The IDQ will continue to stream micro-operations into the processor back end until one of the loop branches redirects control outside of the cached loop body.

BRIEF DESCRIPTION OF THE DRAWINGS

Embodiments are illustrated by way of example and not limitation in the Figures of the accompanying drawings.

DESCRIPTION OF THE EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description.

Embodiments of the invention provide an enhanced loop streaming detection mechanism to reduce power consumption. Instead of or in addition to disabling the logic that feeds into the instruction decode queue (IDQ), the enhanced mechanism disables the logic downstream from the IDQ to save power. The enhanced mechanism learns the contents of the loop body from the IDQ and, based on the learning, determines whether logic downstream from the IDQ can be disabled. In one embodiment, the loop body is issued repeatedly through an Allocator and Register Alias Table (RAT), which is downstream from the IDQ. The enhanced mechanism may optimize the hardware logic in the Allocator and RAT, or may optimize any other hardware logic downstream from the IDQ. The enhanced mechanism may be implemented in a processor having one or more in-order execution cores, or a processor having one or more out-of-order execution cores.

In the following description, examples of the enhanced loop streaming detection mechanism are provided with respect to loops issued from the IDQ and detected by the LSD. It should be appreciated that the enhanced loop streaming detection mechanism can be applied to loops that are stored and detected elsewhere in the front end of a processor. Therefore, examples that are specific to the IDQ are illustrative but not limiting.

Figures 1A, 1B:
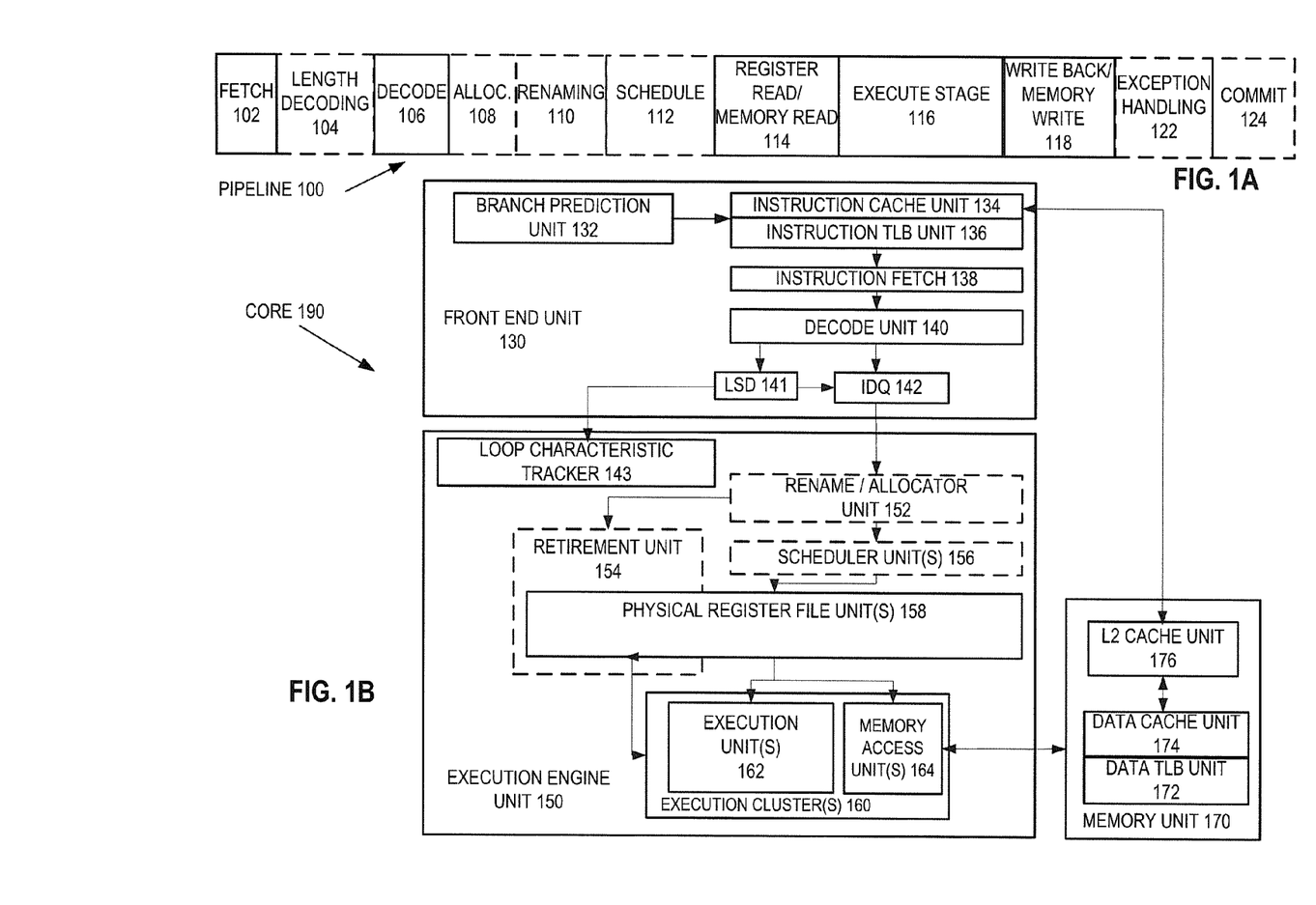
FIG. 1A is a block diagram of an in-order and out-of-order pipeline according to one embodiment.
FIG. 1B is a block diagram of an in-order and out-of-order core according to one embodiment.

Before describing the enhanced loop streaming detection mechanism, it is helpful to explain some basic concepts of in-order and out-of-order execution in a processor. FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A and 1B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB)

136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 (also referred to as Allocator and RAT) in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file unit(s) 158. Each of the physical register file unit(s) 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file unit(s) 158 comprises a vector registers unit, a write mask registers unit, and a scalar registers unit. These register units may provide architectural vector registers, vector mask registers, and general purpose registers. The physical register file unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file unit(s) 158 are coupled to the execution cluster(s) 160.

The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106, where an instruction is decoded into one or more micro-operations (also referred to as "uops"); 3) the rename/allocator unit 152 performs the allocation stage 108 and renaming stage 110, where logical register names are mapped to physical register names and physical registers are allocated; 4) the scheduler unit(s) 156 performs the schedule stage 112, where uops wait in a queue (e.g., a reservation station) until their input operands are available; 5) the physical register file unit(s) 158 and the memory unit 170 perform the register read/memory read stage 114; the execution cluster 160 perform the execute stage 116; 6) the memory unit 170 and the physical register file unit(s) 158 perform the write back/memory write stage 118; 7) various units may be involved in the exception handling stage 122; and 8) the retirement unit 154 and the physical register file unit(s) 158 perform the commit stage 124, where the results are queued and serialized according to the original order of the uops. A result is written back ("committed") to memory or a register file only after all of the older uops have their results written back.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., SSE, AVX1, AVX2, etc.), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

According to embodiments of the invention, the front end unit 130 also includes a loop streaming detector (LSD 141) and an instruction decode queue (IDQ 142) coupled to the decode unit 140. The IDQ 142 stores the uops decoded by the decode unit 140. The LSD 141 checks each uop in the IDQ 142, issued from the IDQ 142, and/or information from the branch predictor, decoded streaming buffer (DSB), or other source of micro-operations to detect the presence of a loop. For simplicity of the illustration, signal paths between the LSD 141 and these other sources of micro-operations are not shown. The IDQ 142 may store one or more iterations of unrolled loop body; the number of uops stored in the IDQ 142 is limited by the size of the IDQ 142. In an alternative embodiment, loops may be stored and detected by different hardware logic in the front end unit 130. The hardware logic that detects the presence of loops may include one hardware component or multiple distributed hardware components. For simplicity of the description, the loop-detecting hardware in the front end unit 130 is collectively referred to as the LSD 141.

When a loop is detected, the LSD 141 sets the tracker bits in a loop characteristic tracker 143 to track the specific operations performed in the loop body. In one embodiment, each tracker bit tracks one or more uops in the loop body that will be using the functions of one or more hardware components in the back end (the execution engine unit 150 in this example). For example, a tracker bit may track whether there is any uop in the loop body that uses floating point functions. If there is none, that hardware components that check for floating point usage, allocate floating point registers, manage and execute floating point operations may be disabled. Thus, according to these tracker bits, the loop characteristic tracker 143 can disable a portion of the hardware components in the execution engine unit 150 to save power. The loop characteristic tracker 143 may be implemented as one hardware component coupled to the hardware components in the execution engine unit 150. Alternatively, the loop characteristic tracker 143 may be implemented as multiple hardware components that are distributed among and coupled to the hardware components in the execution engine unit 150. To avoid obscuring the diagram of FIG. 1B, the loop characteristic tracker 143 is shown as one single component and the connections between the loop characteristic tracker 143 and the components in the execution engine unit 150 are not shown. It is appreciated that alternative embodiments of the loop characteristic tracker 143 may exist as described above.

Figure 2:
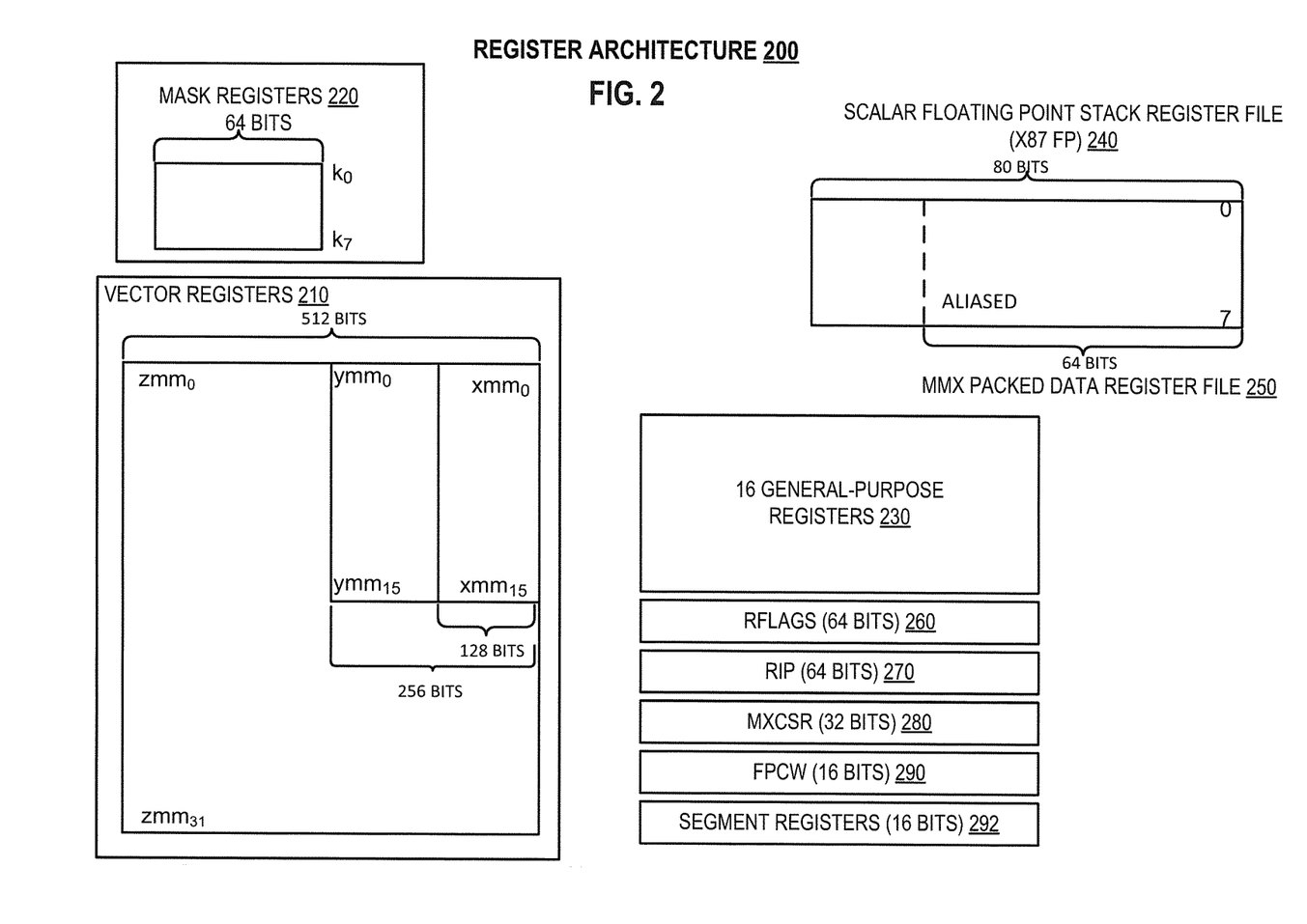
FIG. 2 is a block diagram of register architecture according to one embodiment.

In one embodiment, the operations tracked by the loop characteristic tracker 143 are those operations that alter the contents of one or more logical registers, where each logical register can be mapped to a (versioned) physical register. FIG. 2 illustrates an embodiment of register architecture 200 that implements the physical register file unit(s) 158. The register architecture 200 is based on the Intel® Core™ processors implementing an instruction set including x86, MMX™, Streaming SIMD Extensions (SSE), SSE2, SSE3, SSE4.1, and SSE4.2 instructions, as well as an additional set of SIMD extensions, referred to the Advanced Vector Extensions (AVX). However, it is understood different register architecture that supports different register lengths, different register types and/or different numbers of registers may also be used.

In the embodiment illustrated, there are thirty-two vector registers 210 that are 512 bits wide; these registers are referenced as zmm0 through zmm31. The lower order 256 bits of the lower sixteen zmm registers are overlaid on registers ymm0-16. The lower order 128 bits of the lower sixteen zmm registers (the lower order 128 bits of the ymm registers) are overlaid on registers xmm0-15. In the embodiment illustrated, there are eight mask registers 220 (k0 through k7), each 64 bits in length. In an alternate embodiment, the mask registers 220 are 16 bits width.

In the embodiment illustrated, the register architecture 200 further includes sixteen 64-bit general-purpose (GP) registers 230. In an embodiment they are used along with the existing x86 addressing modes to address memory operands. The embodiment also illustrates a number of special-purpose registers, including but not limited to: RFLAGS registers 260, RIP registers 270, Multimedia Extensions Control and Status Register (MXCSR) register 280, Floating Point Control Word (FPCW) 290 and segment registers 292. The MXCSR 280 contains flags that control and indicate the status of SSE instructions, such as precision, rounding mode, and exception generation. The FPCW 290 also contains flags that control the precision, rounding mode, and exception generation of the floating point units. Each segment register 292 contains a segment address, which can be appended with an offset to form a real address.

The embodiment also illustrates a scalar floating point (FP) stack register file (x87 stack) 240, on which is aliased the MMX packed integer flat register file 250. In the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and xmm registers.

Alternative embodiments of the invention may use wider or narrower registers. Additionally, alternative embodiments of the invention may use more, less, or different register files and registers.

Figure 3:
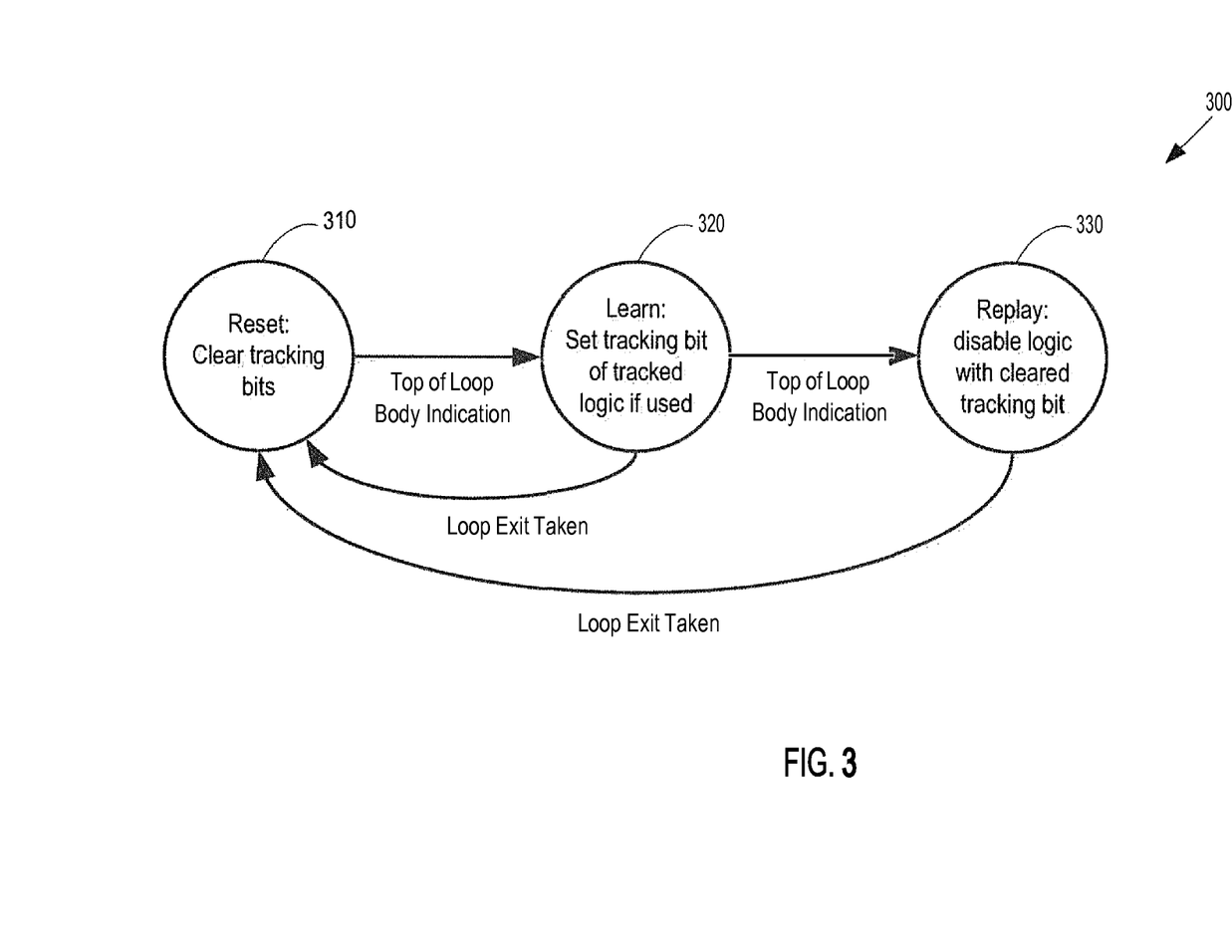
FIG. 3 illustrates a state machine for enhanced loop streaming detection according to one embodiment.

The above description provides an overview of the underlying architecture for the enhanced loop streaming detection. The following description provides the details and examples of enhanced loop streaming detection. FIG. 3 is a state machine 300 for the enhanced loop streaming detection according to one embodiment. The state machine 300 has three states: a reset state 310, a learn state 320 and a replay state 330. During the reset state 310, the tracker bits of the loop characteristic tracker 143 for all tracked functions are cleared. Referring also to FIG. 1B, the LSD 141 is not engaged in the reset state 310. When the LSD 141 detects the top of the loop body, the LSD 141 sends a trigger to the state machine 300 to transition the reset state 310 into the learn state 320. In the learn state 320, for each uop in the detected loop body, the tracker bit for the corresponding tracked characteristic is set if the uop has that tracked characteristic. Each tracked characteristic of the uops identifies a set of functions performed by hardware logic. Thus, using the tracker bits, the loop characteristic tracker 143 is able to learn and identify what hardware logic is to be used by the loop body at the pipe-stage downstream from the decode unit 140 (or more specifically, downstream from the IDQ 142). When the next top of the loop body is detected by the LSD 141, the state machine 300 enters the replay state 330. In the replay state 330, the loop characteristic tracker 143 disables the hardware logic corresponding to each tracker bit that is cleared (or remains cleared from the reset state 310). That is, the loop characteristic tracker 143 disables the hardware logic downstream from the decode unit 140 that is not utilized by the uops in the loop body. If the tracker bit is set, then the corresponding hardware logic is needed and is clocked or powered up as normal.

In one embodiment, only a single path through the loop body can be issued from the IDQ 142. Therefore, during the learn state 320 or the replay state 330, if execution strays from the predetermined path through the loop body (e.g., when a loop exit is taken), the state machine 300 transitions back to the reset state 300 and re-enables all of the tracked logic.

The term "disable" as used herein may be used to mean "power down" or "clock gate." Power down refers to shutting down all power supply to hardware logic; as a result, logic states stored in the hardware logic are lost. Clock gating refers to disabling the toggling of the hardware logic and clocks to save switching power. When hardware logic is clock gated, the logic states stored therein are retained and only leakage currents are incurred. Therefore, clock gating may be used instead of power down when it is necessary or more beneficial to retain the current values of the logic states.

Figure 4:
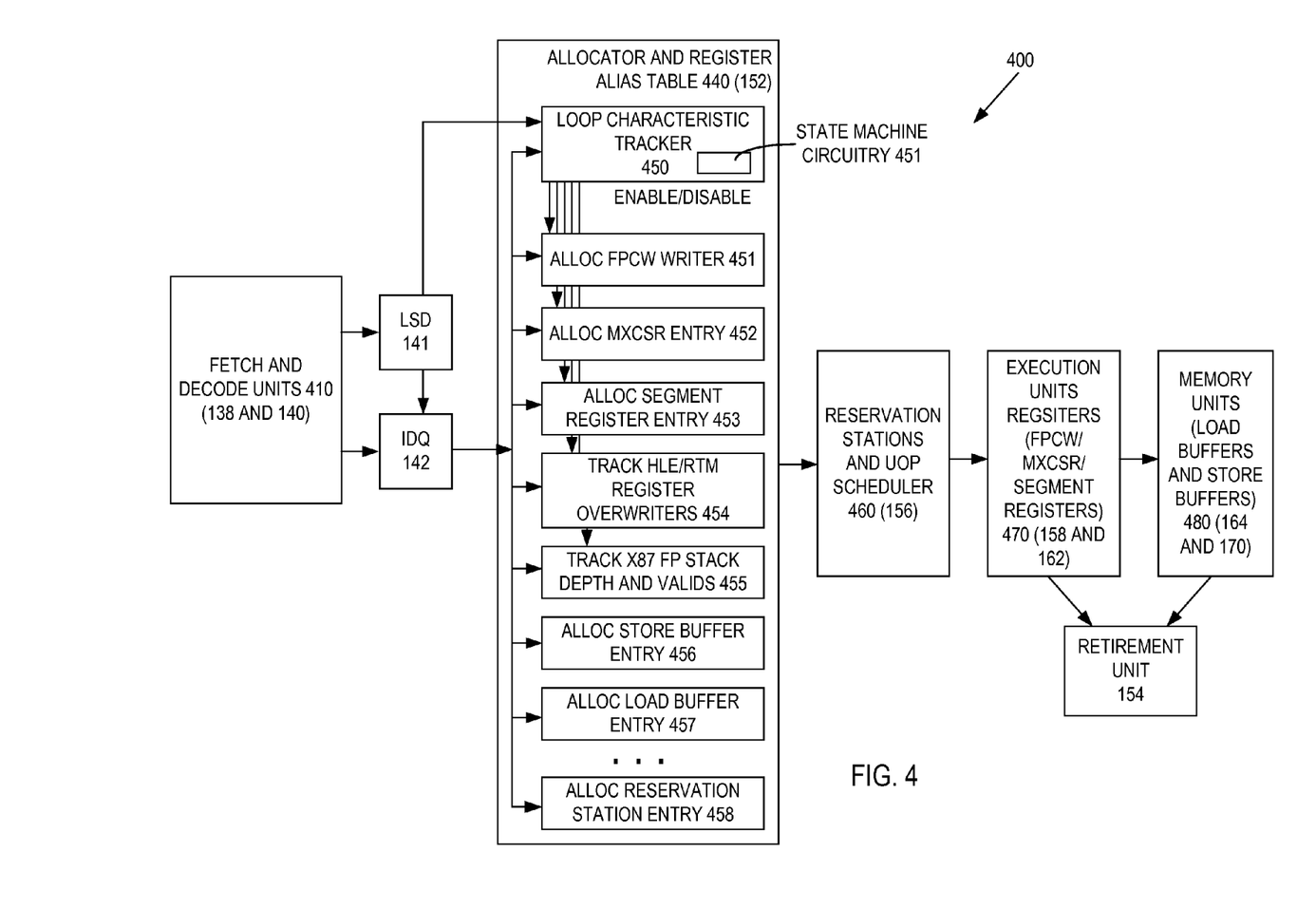
FIG. 4 illustrate example architecture for enhanced loop streaming detection according to one embodiment.

FIG. 4 illustrates an example architecture for the enhanced loop streaming detection according to one embodiment. In this embodiment, the enhanced loop streaming detection is implemented by a core 400 with out-of-order execution capabilities. It is appreciated that a similar enhanced loop streaming detection mechanism can also be deployed in a processor that performs in-order execution. Like elements in FIGS. 1B and 4 bear like reference numerals, and certain aspects of FIG. 1B have been omitted from FIG. 4 in order to avoid obscuring other aspects of FIG. 4. In the embodiment of FIG. 4, the core 400 in the front end includes fetch and decode units 410 (which correspond to the instruction fetch 138 and the decode unit 140), the LSD 141 and the IDQ 142. In the back end of the core 400 (which corresponds to the execution engine unit 150), the core 400 includes an Allocator and Register Alias Table 440 (corresponding to the rename/allocator unit 152), reservation stations and uop scheduler 460 (corresponding to the scheduler unit(s) 156), execution units and registers 470 (corresponding to the execution unit(s) 162 and the physical register file unit(s) 158), and memory units 480 (corresponding to the memory access unit(s) 164 and the memory unit 170). The registers in the execution units and registers 470 further include FPCW, MXCSR and segment registers (an example of which is shown in FIG. 2). The memory units 480 further include load buffers and store buffers. The execution units and registers 470 and the memory units 480 are both coupled to the retirement unit 154.

FIG. 4 also shows a loop characteristic tracker 450 (which corresponds to the loop characteristic tracker 143) within the allocator and RAT 440. It is appreciated that the loop characteristic tracker 450 in alternative embodiments may be located outside of the allocator and RAT 440 and/or may be distributed among the components downstream from the fetch and decode units 410 and the IDQ 142. The loop characteristic tracker 450 includes a state machine circuitry 451 to implement the state machine 300 of FIG. 3. The loop characteristic tracker 450 includes multiple tracker bits to track the uops in the loop body, and includes circuitry to disable hardware components that are not to be used by the uops in the loop body. In the example of FIG. 4, the loop characteristic tracker 450 disables the hardware components within the allocator and RAT 440 only. In an alternative embodiment, the loop characteristic tracker 450 may enable and disable the hardware components within and outside the allocator and RAT 440; for example, any hardware component downstream from the fetch and decode units 410 and the IDQ 142 that are not to be used by the uops in the loop body. However, to disable a hardware component in the any of the units 460, 470, 480 and 154, the loop characteristic tracker 450 needs to wait until all of the uops prior to the detected loop complete their pipeline stages.

In the example of FIG. 4, the loop characteristic tracker 450 includes four tracker bits, where each tracker bit indicates the presence of uops having a shared characteristic in the loop. Having the shared characteristic means that these uops will be using the functions of one or more hardware components. The value of each tracker bit is used to determine whether the one or more hardware components will be used by these uops. The hardware components are disabled if they will not be used by these uops. In an alternative embodiment, the loop characteristic tracker 450 may include any number of tracker bits to track uops with any number of characteristics. Multiple tracker bits can be used to indicate the number of times that a characteristic is detected, or whether a characteristic is detected more than once. For example, a first tracker bit can be set if a specified functionality is detected in the first half of the loop body; likewise, a second tracker bit can be set if the specified functionality is detected in the second half of the loop body.

In one embodiment, the tracker bit 0 may be used to indicate whether the loop body contains any x87 Floating Point Control Word (FPCW) writers or Multimedia Extensions Control and Status Register (MXCSR) writers. Embodiments of the FPCW and the MXCSR are shown in FIG. 2 as the FPCW 290 and MXCSR 280. If there are no uops in the loop body that write into the FPCW or the MXCSR, the hardware components that may be disabled include but are not limited to: the logic that detects whether any uop is a writer to the FPCW/MXCSR, the logic that allocates new FPCW/MXCSR physical registers, and the logic that handles the full stall condition of the FPCW/MXCSR physical registers.

In one embodiment, the tracker bit 1 may be used to indicate whether the loop body contains any memory segment register writers. If there are no uops in the loop body that write into the segment registers, the hardware components that may be disabled include but are not limited to: the logic that detects whether any uop is a writer to the segment registers, the logic that allocates new segment registers, and the logic that handles the full stall condition of the segment registers.

In one embodiment, the tracker bit 2 may be used to indicate whether transactional synchronization is engaged, or there are any uops that alter the state of transactional synchronization. In the embodiment of FIG. 4, the core 400 implements an instruction set architecture, which provides a set of instruction set extensions that allow programmers to specify regions of code for transactional synchronization. Programmers can use these extensions to achieve the performance of fine-grain locking while actually programming using coarse-grain locks. Intel® Core™ processors implement two software interfaces: Hardware Lock Elision (HLE) and Restricted Transactional Memory (RTM), both of which allow programmers to define transactional regions. If there are no uops in the loop body that perform transactional synchronization, the hardware components that may be disabled include but are not limited to: the logic that performs transactional memory operations, the logic that alters a state of the transactional memory operations, and the logic that performs hardware lock control (e.g., HLE control) such as the nesting depth logic, the register liveness tracking logic, etc.

In one embodiment, the tracker bit 3 may be used to indicate whether there are any uops in the loop body that adjust x87 Top of Stack (ToS) indicator or alter the valid status of the floating point stack. If there are no uops in the loop body that perform x87 floating point stack related operations, the hardware components that may be disabled include but are not limited to: the logic that detects x87 floating point stack adjustment uops, and the logic that tracks which x87 stack locations are valid.

Figure 5:
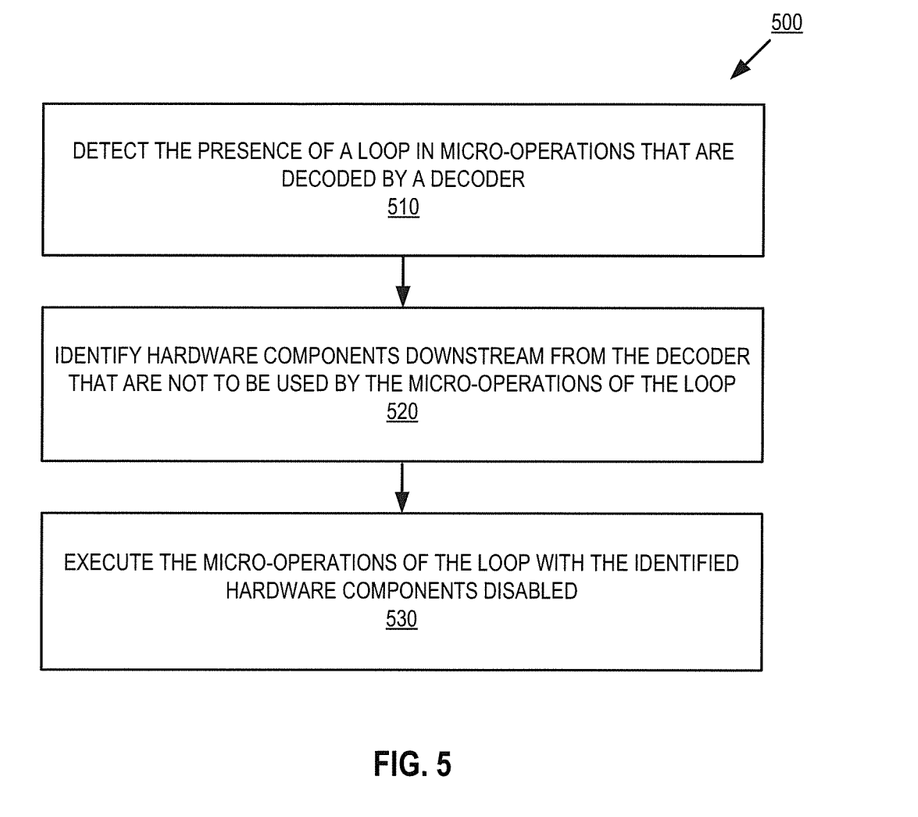
FIG. 5 is a flow diagram illustrating a method of enhanced loop streaming detection according to one embodiment.

FIG. 5 is a flow diagram of a method 500 for performing the enhanced loop streaming detection according to one embodiment. The method 500 begins when a processor (more specifically, the core 190 of FIG. 1B or the core 400 of FIG. 4) detects the presence of a loop in micro-operations that are decoded by a decoder (block 510). The processor identifies hardware components downstream from the decoder that are not to be used by the micro-operations of the loop (block 520), and executes the micro-operations of the loop with the identified hardware components disabled (block 530).

In one embodiment, the LSD 141 may perform the detection at block 510 by examining the uops in the IDQ 142, uops issued from the IDQ 142, and/or information from the branch predictor, decoded streaming buffer (DSB), or other source of micro-operations. Upon detection of a loop, the LSD 141 signals the loop characteristic tracker 143 to transition from the reset state to the learn state as shown in FIG. 3. Hardware components that will be used by the uops of the loop are identified by a first tracker bit value, and hardware components that will not be used by the uops of the loop are identified by a second tracker bit value. The hardware components identified by the second tracker bit value are disabled to save power.

In various embodiments, the method 500 of FIG. 5 may be performed by a general-purpose processor, a special-purpose processor (e.g., a graphics processor or a digital signal processor), or another type of digital logic device or instruction processing apparatus. In some embodiments, the method 500 of FIG. 5 may be performed by a processor, apparatus, or system, such as the embodiments shown in FIGS. 1, 4 and 6-10. Moreover, the processor, apparatus, or system shown in FIGS. 1, 4 and 6-10 may perform embodiments of operations and methods either the same as, similar to, or different than those of the method 500 of FIG. 5.

Processor with Integrated Memory Controller and Graphics

Figure 6:
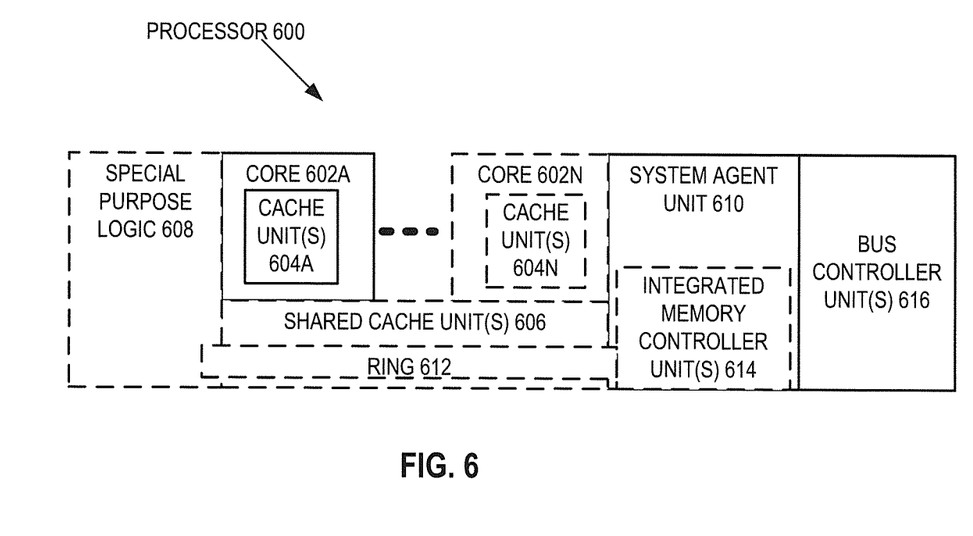
FIG. 6 is a block diagram of a processor according to one embodiment.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
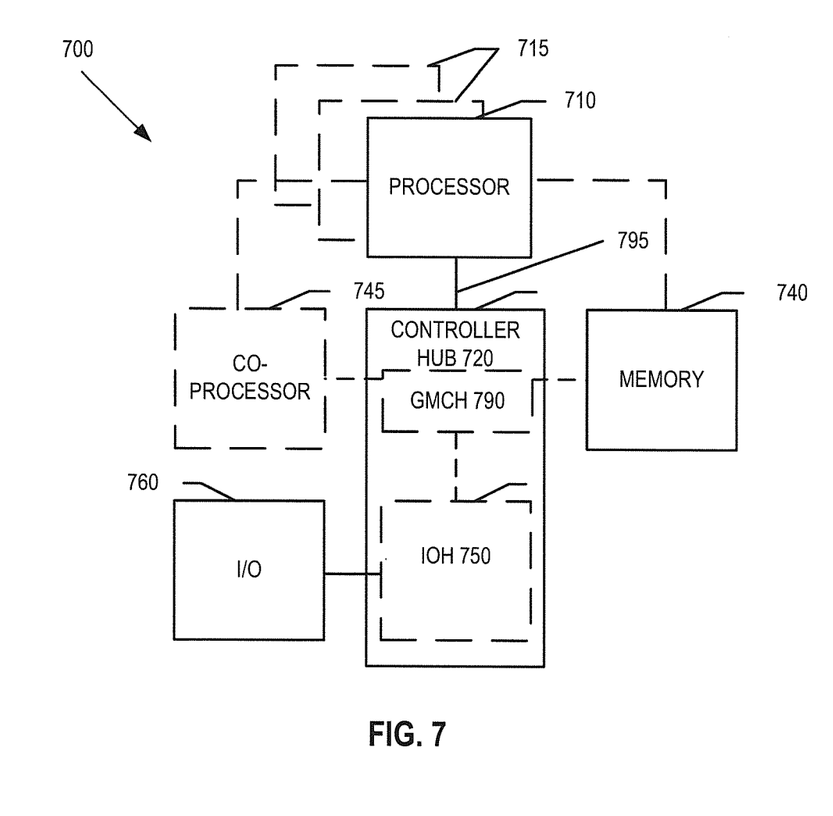
FIG. 7 is a block diagram of a system in accordance with one embodiment.

Referring now to FIG. 7, shown is a block diagram of a system 700 in accordance with one embodiment of the present invention. The system 700 may include one or more processors 710, 715, which are coupled to a controller hub 720. In one embodiment the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processor cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface such as QuickPath Interconnect (QPI), or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 715 in terms of a spectrum of metrics of merit including architectural, micro-architectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
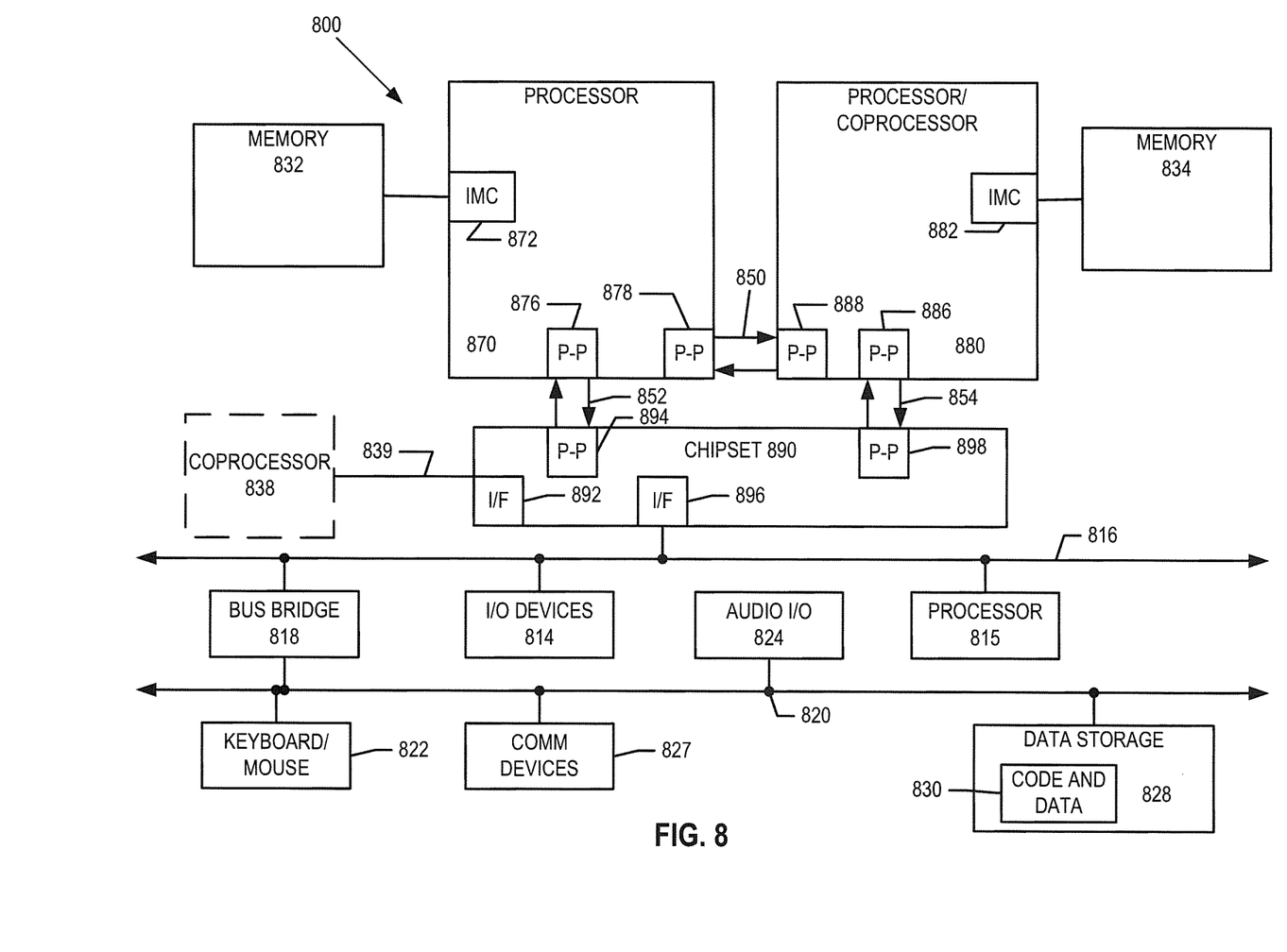
FIG. 8 is a block diagram of a second system in accordance with one embodiment.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 839. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 820. Note that other architectures are possible. For example, instead of the point-to-point architecture of FIG. 8, a system may implement a multi-drop bus or other such architecture.

Figure 9:
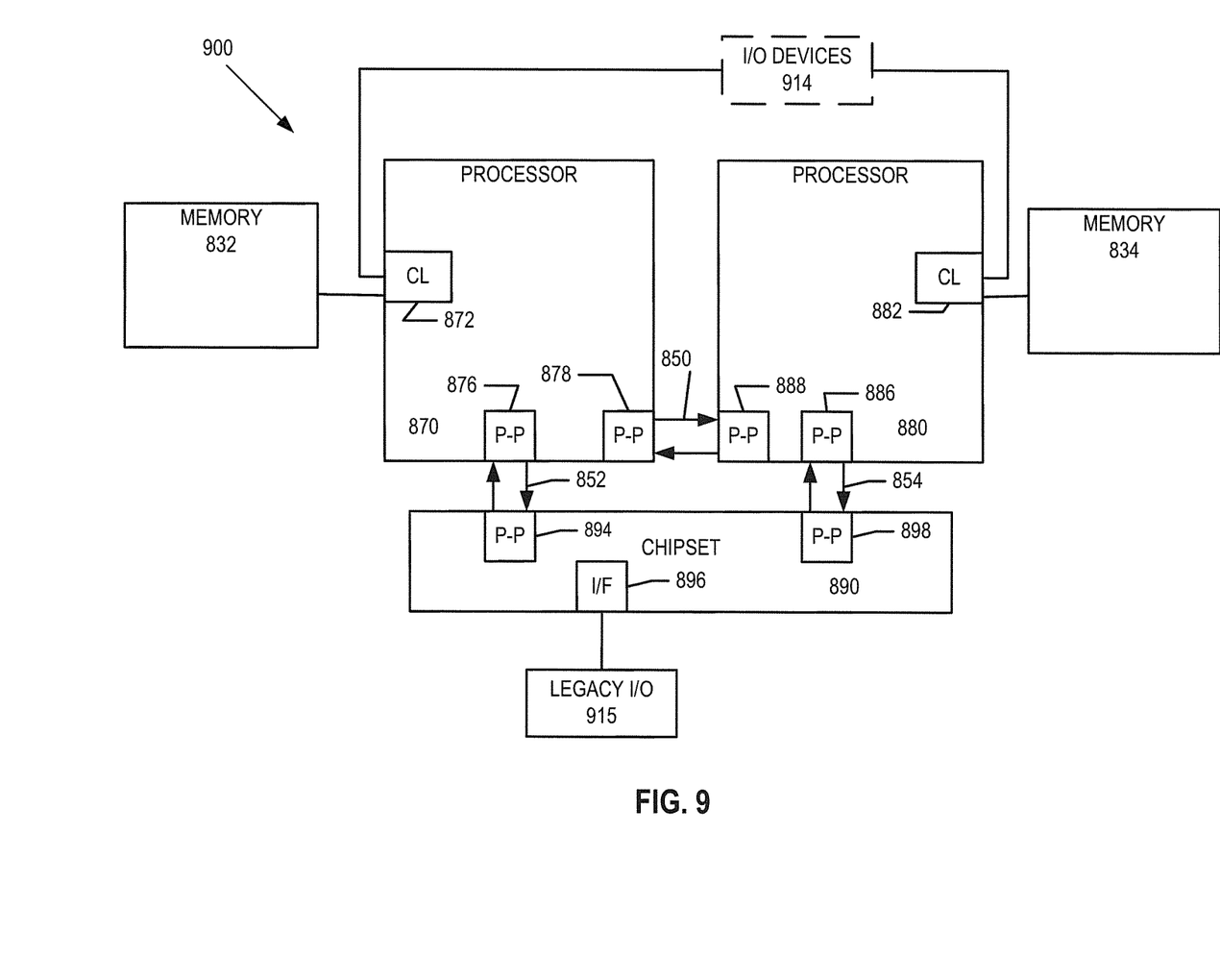
FIG. 9 is a block diagram of a third system in accordance with an embodiment of the invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. Thus, the CL 872, 882 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
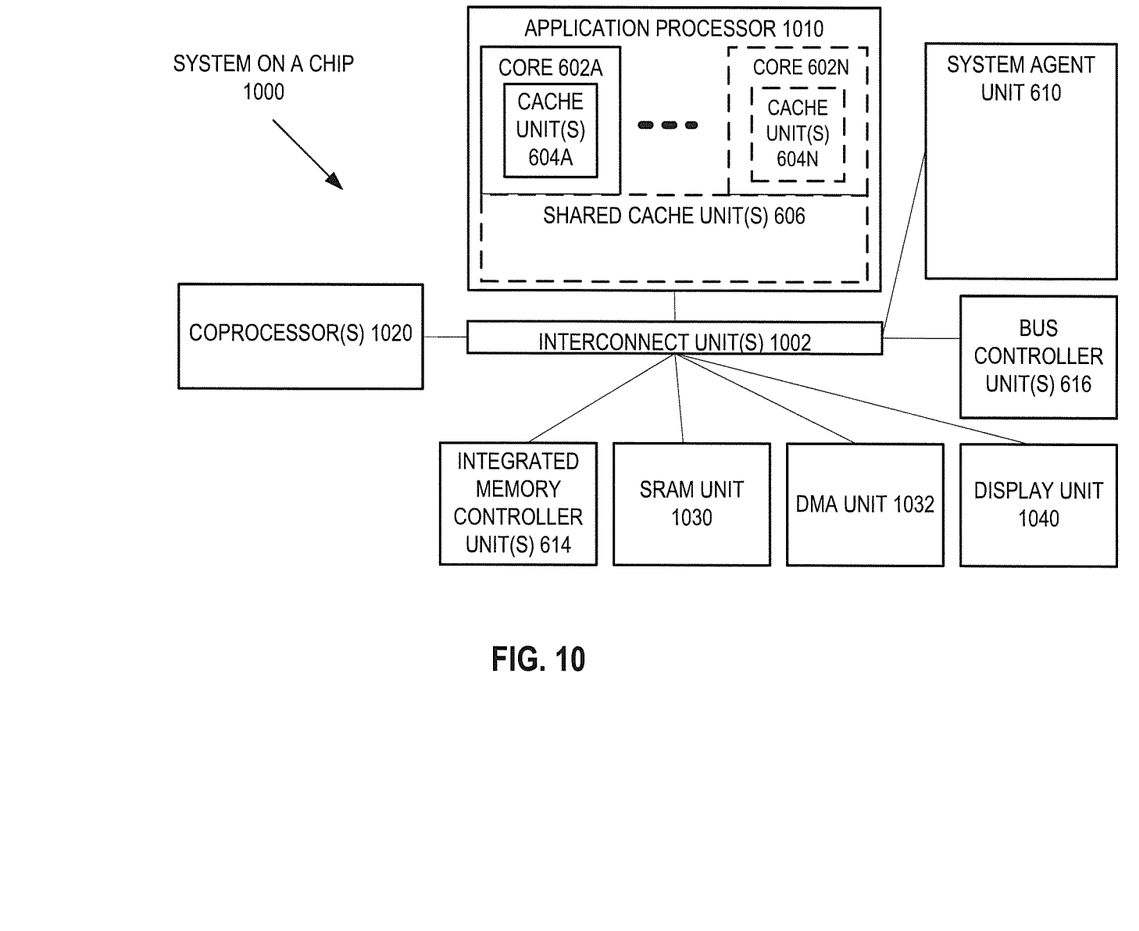
FIG. 10 is a block diagram of a system-on-a-chip (SoC) in accordance with one embodiment.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 602A-N and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
a decoder to decode instructions in a loop into micro-operations;
a loop streaming detector coupled to the decoder to detect presence of the loop in the micro-operations;
a loop characteristic tracker unit coupled to the loop streaming detector to identify hardware components downstream from the decoder that are not to be used by the micro-operations in the loop, and to disable the identified hardware components, wherein the loop characteristic tracker unit comprises a plurality of tracker bits, one or more of the tracker bits indicate whether a micro-operation of a given characteristic is in the loop;
circuitry to implement a state machine, and wherein the state machine to include a reset state where all tracker bits of the loop characteristic tracker unit are cleared, a learn state where tracker bits corresponding to the micro-operations in the loop are set, and a replay state where the micro-operations in the loop are executed with the identified hardware components disabled according to the tracker bits; and
execution circuitry coupled to the loop streaming detector to execute the micro-operations in the loop with the identified hardware components disabled.

2. The apparatus of claim 1, further comprising an instruction decode queue coupled to an output of the decoder to store the micro-operations in the loop, wherein the identified hardware components are downstream from the instruction decode queue.

3. The apparatus of claim 1, wherein the loop characteristic tracker unit is to disable the identified hardware components by powering down or clock gating the identified hardware components.

4. The apparatus of claim 1, wherein the loop characteristic tracker unit is to disable one or more hardware components in an allocator and register alias table unit downstream from the decoder.

5. The apparatus of claim 1, wherein a first subset of the identified hardware components are identified by one or more tracker bits of the loop characteristic tracker unit, the first subset of the identified hardware components include one or more of the following: logic that checks whether a micro-operation writes into one or more special-purpose registers, logic that allocates the special-purpose registers, and logic that handles a full stall condition of the special-purpose registers.

6. The apparatus of claim 5, wherein the special-purpose registers include one or more of the following: a Floating Point Control Word (FPCW) register, a Multimedia Extensions Control and Status Register (MXCSR), and a segment register.

7. The apparatus of claim 1, wherein a second subset of the identified hardware components are identified by one or more tracker bits of the loop characteristic tracker unit, the second subset of the identified hardware components include one or more of the following: logic that performs transactional memory operations, logic that alters a state of the transactional memory operations, and logic that performs hardware lock control.

8. The apparatus of claim 1, wherein a third subset of the identified hardware components are identified by one or more tracker bits of the loop characteristic tracker unit, the third subset of the identified hardware components include one or more of the following: logic that detects floating point stack adjustments, and logic that tracks valid locations of the floating point stacks.

9. A method comprising:
detecting, by a processor, presence of a loop from micro-operations that are decoded by a decoder;
identifying hardware components downstream from the decoder that are not to be used by the micro-operations in the loop;
executing a state machine that includes a reset state where all tracker bits are cleared, a learn state where tracker bits corresponding to the micro-operations in the loop are set, and a replay state where the micro-operations in the loop are executed with the identified hardware components disabled according to the tracker bits; and
executing the micro-operations in the loop with the identified hardware components disabled.

10. The method of claim 9, wherein identifying further comprises:
setting one or more tracker bits to indicate that a micro-operation of a given characteristic is in the loop; and disabling one or more of hardware components associated with the one or more tracking bits when the tracker bit is not set.

11. The method of claim 9, wherein disabling further comprises powering down or clock gating the identified hardware components.

12. The method of claim 9, wherein a first subset of the identified hardware components are identified by one or more tracker bits of a loop characteristic tracker unit downstream from the decoder, the first subset of the identified hardware components include one or more of the following: logic that checks whether a micro-operation writes into one or more special-purpose registers, logic that allocates the special-purpose registers, and logic that handles a full stall condition of the special-purpose registers.

13. The method of claim 9, wherein a second subset of the identified hardware components are identified by one or more tracker bits of a loop characteristic tracker unit downstream from the decoder, the second subset of the identified hardware components include one or more of the following: logic that performs transactional memory operations, logic that alters a state of the transactional memory operations, and logic that performs hardware lock control.

14. The method of claim 9, wherein a third subset of the identified hardware components are identified by one or more tracker bits of a loop characteristic tracker unit downstream from the decoder, the third subset of the identified hardware components include one or more of the following: logic that detects floating point stack adjustments, and logic that tracks valid locations of the floating point stacks.

15. A system comprising:
memory; and
a processor coupled to the memory, the processor comprising one or more cores, each of the cores comprising:
a decoder to decode instructions in a loop into micro-operations;
a loop streaming detector coupled to the decoder to detect presence of the loop in the micro-operations;
a loop characteristic tracker unit coupled to the loop streaming detector to identify hardware components downstream from the decoder that are not to be used by the micro-operations in the loop, and to disable the identified hardware component, wherein the loop characteristic tracker unit comprises a plurality of tracker bits, one or more of the tracker bits indicate whether a micro-operation of a given characteristic is in the loops;
circuitry to implement a state machine, and wherein the state machine to include a reset state where all tracker bits of the loop characteristic tracker unit are cleared, a learn state where tracker bits corresponding to the micro-operations in the loop are set, and a replay state where the micro-operations in the loop are executed with the identified hardware components disabled according to the tracker bits; and
execution circuitry coupled to the loop streaming detector to execute the micro-operations in the loop with the identified hardware components disabled.

* * * * *